United States Patent
Stauffer

(10) Patent No.: US 6,906,909 B2
(45) Date of Patent: Jun. 14, 2005

(54) A C CAPACITOR

(76) Inventor: John E. Stauffer, 6 Pecksland Rd., Greenwich, CT (US) 06831

( * ) Notice: Subject to any disclaimer, the term of this patent is extended or adjusted under 35 U.S.C. 154(b) by 38 days.

(21) Appl. No.: 10/691,236

(22) Filed: Oct. 23, 2003

(65) Prior Publication Data

US 2005/0088802 A1 Apr. 28, 2005

(51) Int. Cl.$^7$ .............................. H01G 4/06; H01G 4/30
(52) U.S. Cl. .................................. 361/321.1; 361/301.4
(58) Field of Search .............................. 361/301.4, 305, 361/306.1, 311, 312, 320, 321.1, 321.2, 321.3, 321.4, 321.5, 322

(56) References Cited

U.S. PATENT DOCUMENTS

| | | | | |
|---|---|---|---|---|
| 3,535,602 A | * | 10/1970 | Hrach et al. | ................. 361/312 |
| 3,988,651 A | * | 10/1976 | Hertz | .......................... 361/305 |
| 4,593,332 A | * | 6/1986 | Akiyama et al. | ............ 360/111 |
| 4,876,140 A | * | 10/1989 | Quackenbush | ............... 428/216 |
| 4,953,273 A | * | 9/1990 | Insetta et al. | ............... 29/25.42 |
| 6,507,477 B1 | | 1/2003 | Stauffer | |
| 2003/0178221 A1 | * | 9/2003 | Chiu et al. | ................ 174/117 F |

* cited by examiner

Primary Examiner—Eric Thomas
(74) Attorney, Agent, or Firm—Young & Basile, P.C.

(57) ABSTRACT

An electrical capacitor is disclosed that includes a mixture of electrically conductive particles and non-conductive particles placed between two parallel conductive plates. The electrically conductive particles are also magnetic. By exposing the mixture of particles to a magnetic field, the electrically conductive particles have been oriented to provide a conductive network.

10 Claims, 1 Drawing Sheet

A C CAPACITOR

FIELD OF THE INVENTION

A new type of electrical capacitor has been developed for use in alternating current circuits. The capacitor comprises a mixture of electrically conductive particles and non-conductive particles spaced between two conductive plates kept nearly equally separated. The electrically conductive particles are magnetic. By subjecting the mixture of particles to a magnetic field, the electrically conductive particles are oriented to provide a network of conductive particles with an extended surface area.

STATE OF THE ART

All capacitors, sometimes known as condensers, are based on the principle that an electric charge on one conductor will induce a charge of opposite polarity on another conductor that is separated from the first by insulating material. In practice, the conductors usually consist of two parallel plates that may be flat or spirally wound. These plates are separated from each other by a thin layer of insulating material known as a dielectric. Such an assembly has the ability to store electric charge and electric energy. The properties of these devices render them extremely useful in every conceivable electronic application.

One approach to improving the functionality of a capacitor is to increase the surface area of the parallel plates. Such a modification will increase the capacitance or ability to store an electric charge. In an attempt to achieve this goal, U.S. Pat. No. 6,507,477 disclosed a novel design that incorporated an intimate mixture of electrically conductive particles and non-conductive particles spaced between two conductive plates. In this random mixture of particles, strands or clumps of conductive particles are formed. These agglomerates have the effect of providing a conductive network with an extended surface area.

Although the new capacitor showed considerable promise, some drawbacks were apparent. The difficulty in obtaining a random mixture of particle was one obstacle. Furthermore, an unavoidable amount of leakage resistance occurred under conditions that led to significant levels of capacitance. Therefore, it is an object of the present invention to provide for an improved capacitor design. This and other objects, features and advantages of the invention will be apparent from the following description and accompanying figure.

SUMMARY OF THE INVENTION

In a preferred embodiment, the present invention discloses an electrical capacitor comprising a mixture of electrically conductive particles and non-conductive particles spaced between two parallel conductive plates to which electrical leads are attached. The electrically conductive particles are magnetic so that when a magnetic field is applied to the mixture of particles, the conductive particles will orient themselves along the magnetic lines of force. The resulting strands will provide an extended network of conductive particles that act as micro capacitors.

The electrically conductive particles are made from any of a number of magnetic materials available. These particles may be coated or plated with an electrically conductive material. The non-conductive particles are fabricated from an electrically non-conductive and non-magnetic material. The size of the particles can vary considerably, but smaller ones provide greater surface area and thus higher capacitance. The lower limit is particles produced by nanotechnology, which is increasing in sophistication. The particles may be any shape; however, spherical particles are preferred.

DETAILED DESCRIPTION OF THE PREFERRED EMBODIMENT

Figure 1:
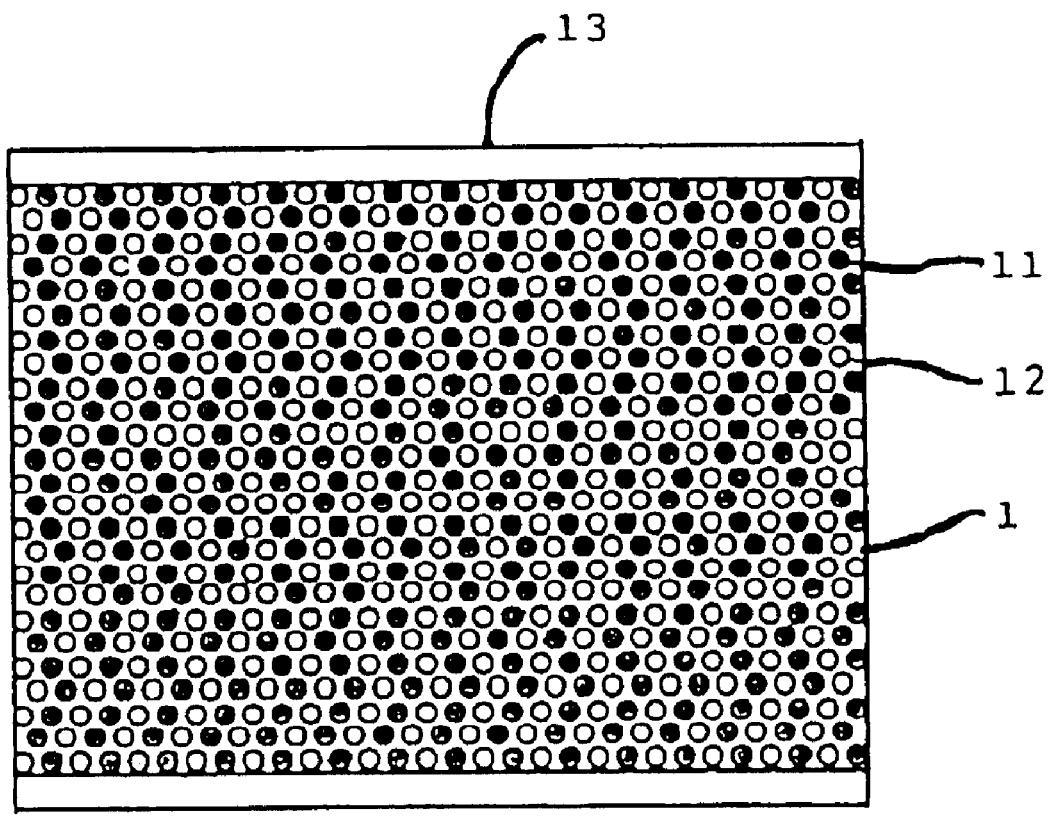
FIG. 1 is a section view of the capacitor of the present invention.

The present invention discloses an electrical capacitor comprising electrically conductive particles and non-conductive particles spaced between two parallel conductive plates to which electrical leads are attached. The size of the particles, both conductive and non-conductive, may vary over a wide range, typically from about 150 microns (100 mesh) all the way down to 1 micron in diameter. The advantages of the present invention are greater, however, when smaller particles are used. Thus, particles as small as those produced by nanotechnology, nano referring to a billionth of a meter, are contemplated.

The rationale for using small particles of an electrically conductive material in a capacitor is that a large surface area can thereby be achieved. When coupled with the use of small particles of a non-conductive material the distance between conductive particles can be reduced proportionally. These effects, when combined with the relationship for capacitance, can be expressed mathematically by the following equation.

$$C = K/D^4$$

where C is capacitance, K is a proportionality constant, and D is the diameter of the particles. This expression is noteworthy because it shows that the capacitance is inversely proportional to the fourth power of the diameter of the particles.

In designing a capacitor, a number of practical considerations must be faced. When conductive and non-conductive particles are thoroughly mixed so as to form a random composition, strands or clumps of conductive particles are formed within the matrix. These agglomerates are isotropic such that their orientation is equal in all directions.

The agglomerates of conductive particles will form a network between the plates of the capacitor. In essence, the agglomerates will act as micro capacitors, the sum of which equals the whole capacitor formed by the parallel plates and the interspaced particles.

The effects of the agglomerates in a random mixture of particles are not equal. Those agglomerates with chains that are oriented in the same direction as the plates will act as tiny capacitors arranged in series. The total capacitance produced by such agglomerates can be determined by the expression:

$$1/C = 1/C_1 + 1/C_2 + \ldots + 1/C_n$$

where C is the capacity of the system of condensers connected in series and $C_n$ is the capacity of an individual condenser.

By contrast, those agglomerates with chains oriented perpendicular to the plates will act more like micro capacitors arranged in parallel. The expression for this arrangement is:

$$C = C_1 + C_2 + \ldots + C_n$$

where C is the capacity of the system of condensers connected in parallel and $C_n$ is the capacity of a separate condenser.

From the above expressions, it is apparent that the maximum capacitance can be achieved by aligning the agglomerates of conductive particles so that their chains are perpendicular to the plates. This result is obtained in the present invention by use of a magnetic field. First, it is necessary that the electrically conductive particles be magnetic. When a magnetic field is applied, the particles will line up parallel to it and will be attracted to each other. This effect is frequently used to demonstrate the true lines of force of a magnetic field.

A better understanding of the present invention is gained by referring to FIG. 1, which shows the features of capacitor 1. The mixture of conductive particles 11 and non-conductive particles 12 is spaced between two parallel plates 13. The conductive particles are arranged in strands perpendicular to the plates. The conductive particles are oriented by applying a magnetic field when undergoing movement. Vibration, for example, can be achieved by means of sonic resonance before the end plates are tightly secured. The strands of conductive particles reach outwards from the plates but do not extend across the capacitor. Depending on the proportion of conductive particles to non-conductive particles the strands are broken in at least one place.

A wide range of magnetic materials is available, which can be employed in the present invention. These include the soft magnetic metals, namely, iron, nickel and cobalt. Permanent magnets have been dramatically improved over the years. In chronological order the following products have been introduced: alloy steels; alnico, an alloy of aluminum, nickel and cobalt; hard ferrites of iron oxide containing barium or strontium; rare-earth magnets based on a compound of cobalt and samarium; and lastly, neo magnets made from a compound of iron, neodymium and boron.

Some of the magnetic materials are good conductors of electricity. Others can be plated with metals to improve the electrical conductance. Coatings of less reactive metals such as gold and platinum will also reduce the contact resistance between particles. Alternatively, to reduce contact resistance, pressure can be applied to the mixture of particles by means of a piston or other suitable device.

The non-conductive particles can be made of a number of materials including plastic, ceramics and glass. Certain of these materials-have been shown to have high dielectric constants. Barium titanate is notable in this respect.

The particles, both electrically conductive and non-conductive, used in the present invention can be any shape, but spherical or spheroidal particles have some advantages. They provide a large free surface area, and they flow easier. The proportion of conductive to non-conductive particles may vary extensively. The practical limits must be determined by experiment; however, in theory anywhere from 100 percent conductive particles to zero percent may be employed depending on the geometry of the capacitor.

The potential applications of the present invention depend on the promise of exceptionally high capacitance and compact design. Capacitors of the present invention are A C capacitors meaning that they can function with alternating current as well as direct current. Because of the simplicity of design and the use of standard materials, the cost of capacitors produced by the present invention should be modest.

EXAMPLE

An experiment was performed to determine the fluidity of a bed of particles when subjected to sonic vibration. Glass spheres, 3 mm in diameter, were placed in a glass jigger. Three lead shot of about the same size were placed on the surface. An electric toothbrush was used as a sonic transducer. After about two minutes of applied vibration the lead balls had dropped two layers into the bed.

The experiment was repeated using 1.5 mm glass spheres and a comparable lead shot. This time the lead shot sank about five layers after close to two minutes of vibration. During both runs the glass beads were fluidized undergoing rapid motion.

What is claimed is:

1. An electrical capacitor comprising a mixture of electrically conductive particles and non-conductive particles, the conductive particles being magnetic and the non-conductive particles being non-magnetic, said mixture being spaced between two parallel conductive plates to which electrical leads are attached; wherein said conductive particles are aligned into strands that are perpendicular to said conductive plates by the application of a magnetic field.

2. A capacitor according to claim 1 where the magnetic material is selected from the group consisting of iron, nickel, cobalt, alloy steel, alnico, hard ferrites, rare-earth magnets, and neo magnets.

3. A capacitor according to claim 1 where the electrically conductive particles are plated with a metal.

4. A capacitor according to claim 3 where the metal is selected from the group consisting of gold and platinum.

5. A capacitor according to claim 1 where the electrically non-conductive particles are made of a material selected from the group consisting of plastics, ceramics, and glass.

6. A capacitor according to claim 5 where the material used for the electrically non-conductive particles is barium titanate.

7. A capacitor according to claim 1 where the electrically conductive particles are of a size in the range of 100 mesh to 1 micron in diameter.

8. A capacitor according to claim 1 where the electrically conductive and non-conductive particles are spherical in shape.

9. A capacitor according to claim 1 where the electrically conductive and non-conductive particles are spheroidal in shape.

10. A capacitor according to claim 1 wherein said conductive particles are aligned by the application of motion to said mixture of particles.

* * * * *